US010284471B2

United States Patent
Vinsel et al.

(10) Patent No.: US 10,284,471 B2
(45) Date of Patent: May 7, 2019

(54) AIA ENHANCEMENTS TO SUPPORT LAG NETWORKS

(71) Applicant: VSS Monitoring, Inc., Sunnyvale, CA (US)

(72) Inventors: Peter C. Vinsel, Berkeley, CA (US); Win Naing, Palo Alto, CA (US); John Yu, Saratoga, CA (US)

(73) Assignee: Netscout Systems, Inc., Westford, MA (US)

( * ) Notice: Subject to any disclaimer, the term of this patent is extended or adjusted under 35 U.S.C. 154(b) by 239 days.

(21) Appl. No.: 14/807,514

(22) Filed: Jul. 23, 2015

(65) Prior Publication Data

US 2017/0026289 A1 Jan. 26, 2017

(51) Int. Cl.
*H04L 12/743* (2013.01)
*H04L 12/931* (2013.01)
*H04L 12/721* (2013.01)
*H04L 29/06* (2006.01)

(52) U.S. Cl.
CPC ........ *H04L 45/7453* (2013.01); *H04L 49/354* (2013.01); *H04L 45/66* (2013.01); *H04L 69/00* (2013.01)

(58) Field of Classification Search
CPC ... H04L 43/10; H04L 43/0829; H04L 45/245; H04L 45/38; H04L 47/2483; H04L 49/20; H04L 49/30; H04L 67/2852
See application file for complete search history.

(56) References Cited

U.S. PATENT DOCUMENTS

| 9,537,972 | B1* | 1/2017 | Edwards | H04L 67/2852 |
| 9,571,400 | B1* | 2/2017 | Mandal | H04L 47/125 |
| 2007/0280258 | A1* | 12/2007 | Rajagopalan | H04L 45/245 370/395.3 |
| 2010/0157799 | A1* | 6/2010 | Nice | H04L 45/745 370/235 |
| 2010/0183011 | A1* | 7/2010 | Chao | G06Q 10/04 370/392 |
| 2010/0246593 | A1* | 9/2010 | Belanger | H04L 47/2483 370/419 |
| 2014/0119193 | A1* | 5/2014 | Anand | H04L 45/28 370/237 |

(Continued)

*Primary Examiner* — Habte Mered
*Assistant Examiner* — Prince A Mensah
(74) *Attorney, Agent, or Firm* — Locke Lord LLP; Scott D. Wofsy; Christopher J. Capelli

(57) ABSTRACT

A method for maintaining packet's source network identification information while aggregating packets from a plurality of networks is provided. An ingress packet is processed to extract a plurality of packet header fields and port identifier. A first hash index is generated by hashing information associated with the plurality of packet header fields. The extracted port identifier is stored in a hash table using the generated first hash index. The ingress packet is forwarded to one or more inline tool devices. An egress packet received from the one or more inline tools is processed to extract the plurality of packet header fields. A second hash index is generated by hashing information associated with the plurality of packet header fields. The port identifier is retrieved from the hash table based on the generated second hash index. The egress packet is transmitted to a switching device based on the retrieved port identifier.

18 Claims, 7 Drawing Sheets

(56) References Cited

U.S. PATENT DOCUMENTS

| | | | |
|---|---|---|---|
| 2015/0319083 A1* | 11/2015 | Grosser, Jr. | H04L 41/12 |
| | | | 370/218 |
| 2016/0087902 A1* | 3/2016 | Srinivasan | H04L 12/4641 |
| | | | 370/392 |
| 2016/0323166 A1* | 11/2016 | Pandey | H04L 43/087 |
| 2016/0323179 A1* | 11/2016 | Wang | H04L 45/28 |

* cited by examiner

AIA ENHANCEMENTS TO SUPPORT LAG NETWORKS

FIELD OF THE INVENTION

The present invention relates generally to computer networks and, more particularly, to supporting network links aggregated into a Link Aggregation Group (LAG).

BACKGROUND OF THE INVENTION

Communication networks are important for providing data and voice communication. Communication networks allow many different computing devices, for example, personal computers, IP telephony devices or servers to communicate with each other and/or with various other network elements or remote servers attached to the network. Such networks regularly include many interconnected nodes, commonly known as switches or routers, for routing traffic through the network. Monitoring networks is important to ensure reliable operation, fault detection, timely mitigation of potentially malicious activities, and more. Network taps are generally known in the art for connecting to networks and providing a port to monitor the communication traffic on the network. Such networks regularly include many interconnected nodes, commonly known as switches or routers, for routing traffic through the network.

In packet switched communication systems, a router is a switching device that receives packets containing data or control information on one port, and based on destination information contained within the packet, routes the packet out another port to a destination (or an intermediary destination). Conventional routers perform this switching function by evaluating header information contained within a first data block in the packet. Efficient switching of packets through the router is of paramount concern.

To help alleviate the problem of limited access to networks for monitoring, inline packet aggregation devices have been developed that allow sharing access to the monitored network data. These packet aggregation devices allow users to take data from one or more network monitoring points and forward it to multiple different monitoring tools according to user specified forwarding rules. The packet aggregation devices typically provide some filtering capabilities beyond traditional packet switches/routers including the ability to aggregate and filter traffic from multiple network sources and the ability to multicast traffic to multiple ports. It is desirable for such packet aggregation devices to have an ability to identify network sources for each packet especially if multiple network links are aggregated into one or more LAGs.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for maintaining packet's source network identification information while aggregating packets from a plurality of networks is provided. An ingress packet is processed to extract a plurality of packet header fields and port identifier. A first hash index is generated by hashing information associated with the plurality of packet header fields. The extracted port identifier is stored in a hash table using the generated first hash index. The ingress packet is forwarded to one or more inline tool devices. An egress packet received from the one or more inline tools is processed to extract the plurality of packet header fields. A second hash index is generated by hashing information associated with the plurality of packet header fields. The port identifier is retrieved from the hash table based on the generated second hash index. The egress packet is transmitted to a switching device based on the retrieved port identifier.

In another aspect, a communication system which includes a plurality of networks combined into a Link Aggregation Group (LAG) is provided. The system also includes one or more inline tool devices configured to monitor and analyze a flow of LAG network traffic. The system further includes an Advanced Inline Aggregation (AIA) device connected to each of the plurality of networks and connected to the one or more inline tool devices. The AIA device stores therein a plurality of programming instructions, which when executed on the AIA device cause the AIA device to process an ingress packet to extract a plurality of packet header fields and port identifier. The plurality of program instructions further includes program instructions which cause the AIA device to generate a first hash index by hashing information associated with the plurality of packet header fields and cause the AIA device to store the port identifier in a hash table using the generated first hash index. The plurality of program instructions further includes program instructions to forward the ingress packet to one or more inline tool devices. The plurality of program instructions also includes program instructions which cause the AIA device to process an egress packet received from the one or more inline tools to extract the plurality of packet header fields and to generate a second hash index by hashing information associated with the plurality of packet header fields. Additionally, the plurality of program instructions includes program instructions which cause the AIA device to retrieve the port identifier from the hash table based on the generated second hash index and to transmit the egress packet to a switching device based on the retrieved port identifier.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
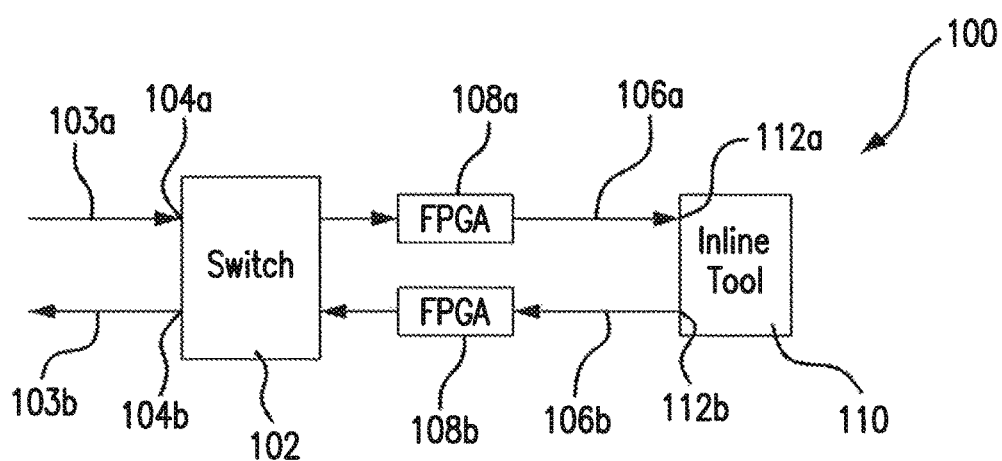
FIG. 1 is a block diagram illustrating internal network configuration able to route traffic flows between a network switch and an inline processing tool by translating user specified identifiers to internal identifiers, in accordance with an embodiment of the present invention.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention. For example, reference is made to Ethernet Protocol but other protocols can be used in the invention. The embodiments of the invention are applicable to both wire and optical technologies.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

As used herein, a "link" can include a communication channel that connects two or more communicating network elements. The term "network element" encompasses computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "ingress" refers to the arrivals direction in which packets are processed; while the term "egress" refers to the departure direction in which packets are processed. For example, an ingress port typically refers to the port on which a packet is received by a packet switching device, and an egress port typically refers to the port from which a packet will exit a packet switching device.

Turning now descriptively to the drawings, in which similar reference characters denote similar elements throughout the several views, FIG. 1 is a block diagram illustrating internal network configuration of a network monitoring system able to route traffic flows between a network switch and an inline processing tool by translating user specified identifiers to internal identifiers, in accordance with an embodiment of the present invention. The network monitoring system 100 illustrated in FIG. 1 includes a network switch 102. As one of ordinary skill in the art will appreciate, each network device in system 100 can be physically associated with a port of a switch to which it is connected. Data packets pass through the network. Data frames, or packets, can be transferred between network devices by means of a switch's logic link control (LLC)/media access control (MAC) circuitry, or "engines", associated with ports on a network device, e.g., switch 102. As used herein, the term "frame" can include L2 messages in OSI model. The network switch 102 forwards data frames received from a transmitting network device to a destination network device based on the header information in received data packets. The switch 102 can also forward packets from a given network to other networks through ports on one or more other switches.

Network monitoring systems typically analyze frames or packets of data as they pass through a network. The medium on which the data is carried is typically optical fiber or copper cable. The network monitor requires access to this medium in order to obtain visibility of the data passing through it. This requires the network monitor to be placed either in-line with the network link or on the span port output of a network switch or router. In FIG. 1 there is shown the connection of the network monitor 110 to the first bypass port 104*a* of the network switch 102. The method of gaining access to data on the network link is commonly referred to as "tapping".

In-line tapping may be achieved using passive or active tapping methods. Both of these methods require that the insertion into the network be unobtrusive so as not to affect the transmission of data between the devices on the network. An active tap re-drives the network data passing though it 106*a* such that the ongoing signal passed back to the network 106*b* is not degraded. A passive tap does not provide for any regeneration of the signal.

Thus, active tapping is achieved in the configuration illustrated in FIG. 1 using port-bypass features of the switch 102 in the front-end portion of the network monitor 110. It is noted that in various embodiments, network monitor 110, referred to hereinafter as inline tool, may comprise any inline data processing device including, without limitation, any suitable inline network device configured to manage network access, perform load balancing and/or configured to provide high availability/fail-over of in-line network devices (e.g., intrusion prevention systems, proxy servers, and WAN accelerators). It is noted inline tool 110 receives data from network link 103a through a first bypass monitor port 112a, makes the copy of the data for subsequent processing and loops the data back to the opposite channel 106b connected to a second bypass monitor port 112b of the inline tool 110, which re-drives the data back onto the network link 103b through the second bypass port 104b of the network switch 102.

In one embodiment of the present invention, the network switch 102 comprises a VLAN enabled switch. A virtual local area network (LAN) or "VLAN" is a logical subdivision of a Layer 2 network that makes a single Layer 2 infrastructure operate as though it were multiple, separate Layer 2 networks. This is accomplished by adding a numeric tag field (e.g., a VLAN tag) to each data packet as it leaves a Layer 2 switch which identifies the VLAN number to which the packet belongs. Other VLAN-enabled switches honor the VLAN numbering scheme to segregate the network into logical, virtual networks.

The customer specific VLAN tag is generally appended to VLAN traffic in the customer network using an identifier selected from a particular VLAN space comprising a set of VLAN identifier (VID) values. To differentiate the traffic of the various customers, the service provider generally assigns each customer a set of one or more unique VID values.

In some embodiments of the present invention, the monitoring system 100 may include network packet brokers described below (shown in FIG. 3). To maintain transparency, it is highly desirable for the monitoring system 100 to preserve the identity of the source network for each received packet. It is noted that some network packet brokers add different internal VLAN tags in each direction 106a and 106b when processing packets, as discussed below.

Figure 2:
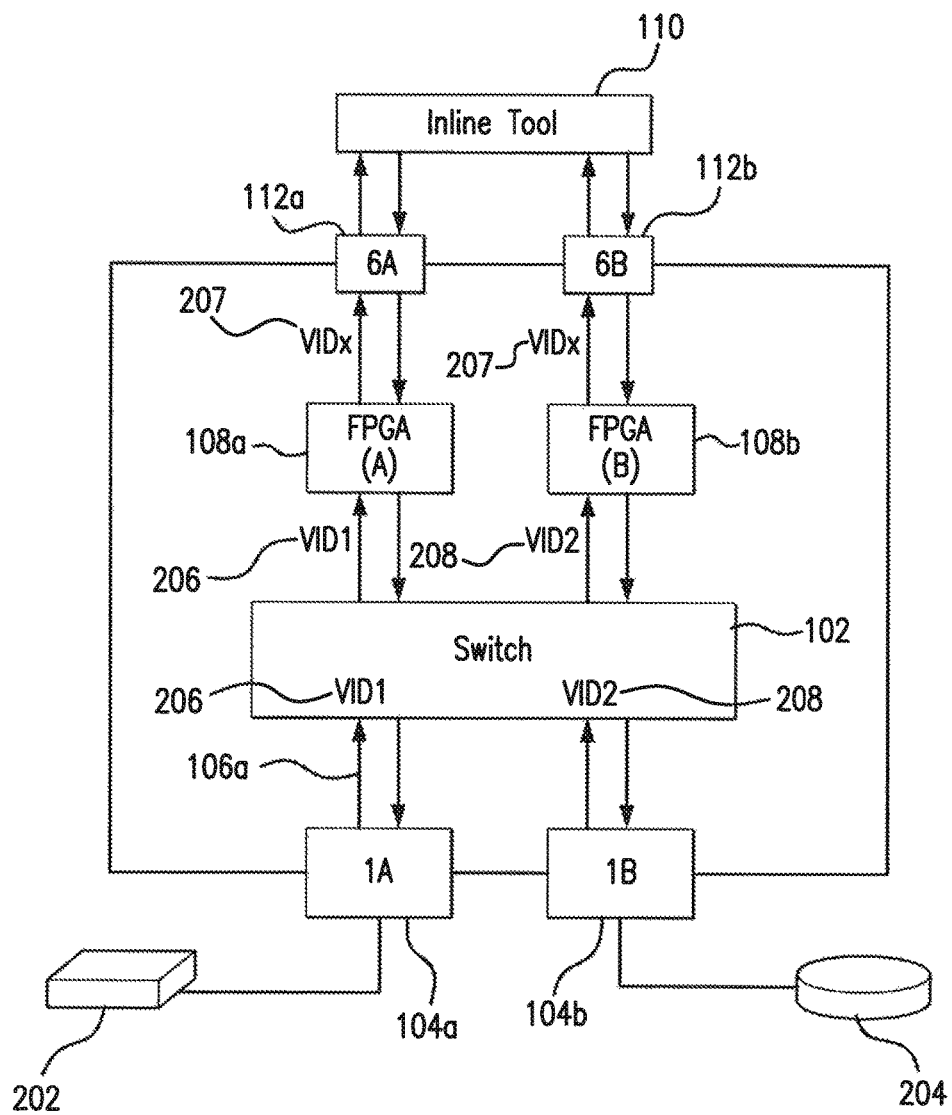
FIG. 2 is an expended block diagram illustrating internal network configuration able to route traffic flows between a network switch and an inline processing tool by translating user specified identifiers to internal identifiers, in accordance with an embodiment of the present invention.

FIG. 2 is an expended block diagram illustrating internal network configuration of a network monitoring system able to route traffic flows between a network switch and an inline processing tool by translating user specified identifiers to internal identifiers, in accordance with an embodiment of the present invention. Generally, carrier Internet Protocol (IP) networks are organized in tiers, where the lower tiers include edge routers 202, 204 that connect to larger core routers (shown in FIG. 4). The edge routers 202, 204 perform numerous IP protocol functions, whereas the core routers are mostly called upon to forward traffic from one edge router 202, 204 to another. The edge routers 202, 204 are directly connected to the switch 102 having a pair of network bypass ports 104a and 104b. According to an embodiment of the present invention, the switch 102 adds a VID tag 206, 208 to each packet as it leaves the switch 102. As shown in FIG. 2, the switch 102 assigns different tags to the traffic flowing through different ports. However, to keep transparency of the active tapping both ingress and egress ports of a given communication session must have same VID.

According to an embodiment of the present invention, FPGA programmable devices 108a and 108b connected to a pair of bypass monitoring ports 112a and 112b, respectively, of inline tool 110 are programmed to translate internal (switch assigned) VIDs, such as VID1 206 and VID2 208 to a customer specified VID, such as VIDx 207. In this mode of operation FPGA devices 108a and 108b remove VLAN tags from each packet prior to sending it to the inline processing tool 110 via a corresponding bypass monitor port 112a and 112b. In reverse direction, the VLAN tag is inserted back at the beginning of the packet by the FPGA devices 108a and 108b. It is noted that in order to add a proper VLAN tag on the way out of the inline processing tool 110, the FPGA devices 108a and 108b may utilize a MAC learning function described in greater detail below.

Figure 3:
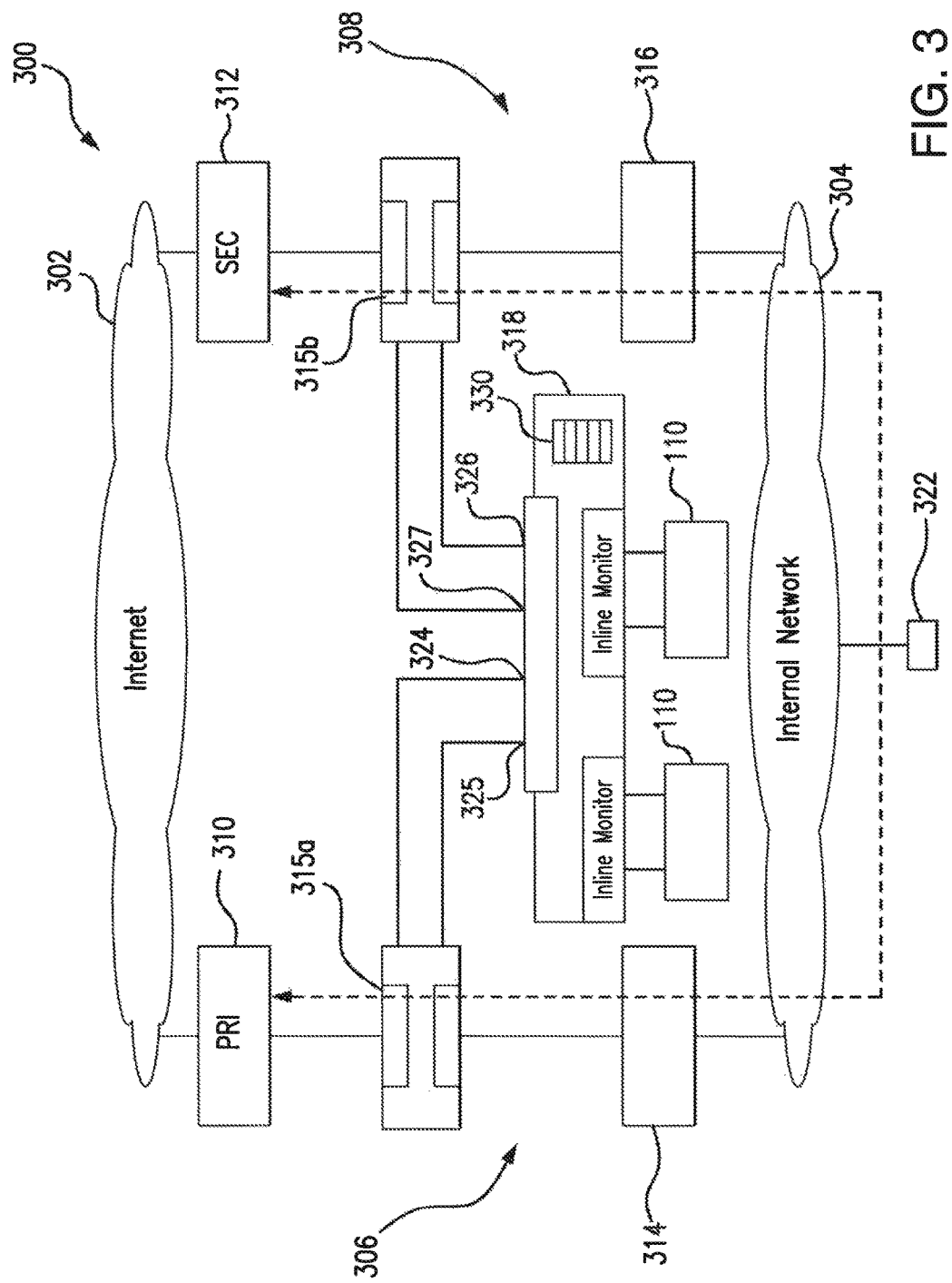
FIG. 3 is a block diagram illustrating a communication system which includes a plurality of networks having an L2 connection between them, according to one embodiment of the invention.

FIG. 3 is a block diagram illustrating a communication system which includes a plurality of networks having an L2 connection between them. The exemplary network topology of the communication system 300 includes a plurality of networks such as a primary network 306, secondary network 308, internal network 304 and Internet 302. In the illustrated example, the primary network 306 is coupled to the Internet 302 via first gateway that comprises a first router 310, while the second network 308 is coupled to the Internet 302 via a second gateway that comprises a second router 312. In one embodiment, routers 310 and 312 comprise redundant routers employing a redundant routing protocol (such as Hot Standby Router Protocol (HSRP), although the principles described herein are also applicable to other redundant routing protocols such as Virtual Router Redundancy Protocol (VRRP)). By redundant routers is meant a gateway that employs multiple routers for routing packets. A protocol associated with the redundant routers controls the operation of the redundant routers. All routers share a "virtual IP" address, so they are all seen as one address. VRRP can also be used for load sharing. As those skilled in the art can readily appreciate, the principles described herein are not specific to any one or more redundant router protocols, such as HSRP and/or VRRP, but can be employed with any suitable router protocol.

In addition, both primary network 306 and secondary network 308 are connected to the internal network 304 via switches 314 and 316, respectively. In one embodiment, the internal network 304 comprises a Virtual Private Network (VPN) over a layer 2 (L2) infrastructure. In other words, internal network 304 provides the required L2 connectivity across an IP transport to a plurality of network devices such as laptop 322. Accordingly, the switches 314 and 316 comprise L2 networking devices. Furthermore, both primary network 306 and secondary network 308 may include one or more network packet broker devices 315a and 315b, respectively. The network packet brokers 315 (collectively) filter network traffic from port mirrors, network TAPs, and probes. For example, inline tools (i.e., network security and performance tools) 110 may only support 2 GBps of traffic, and the network packet brokers 315a and 315b can be manually configured to filter and shape traffic from a 8 GBps link to conform to the constraint of the network security and performance tools 110. In the illustrated example, the network packet brokers 315a serve the filtered network traffic to an advanced inline aggregation device 318. In one embodiment, the advanced inline aggregation (AIA) device 318 comprises a TAP (Test Access Point) which is an active splitting mechanism installed between the one or more inline tools 110 and the corresponding networks 306, 308.

AIA device 318 transmits both the send and receive data streams simultaneously on separate dedicated channels, ensuring all data arrives at the network security and performance tools 110 in real time. According to an embodiment of the present invention, the AIA device 318 includes a hash table storage 330, hardware logic programmed to perform various packet processing operations (including steps described in conjunction with FIGS. 6 and 7 below), and multiple ports 324-327. In several embodiments, such hardware logic comprises programmable logic components (e.g. FPGA, or complex programmable logic device (CPLD)). In another embodiment, AIA device's 318 logic is implemented using any number of discrete logic components. In yet another embodiment, AIA device processing circuitry 318 is implemented using an application specific integrated circuit (ASIC). It is appreciated that the communication system 300 can include any number of physical switches 314, 316, physical or virtual routers 310, 312, physical network packet brokers 315, and other physical or virtual network elements, without deviating from the present disclosure.

It is noted that when the AIA device 318 aggregates multiple inline network port pairs into a tool (or tool chain), it's important for the AIA device 318 to know if there are L2 connections between adjacent ports. Since the AIA device 318 aggregates the traffic before sending it to the inline tools 110, it should also be able to split out the reversed traffic received back from the inline tools 110. In one embodiment of the present invention, network packet broker devices 315a and 315b may be configured to add VIDs to the network traffic, wherein each VID uniquely identifies the ingress network port the packet was originally received from and that VID tag can be used to send the packet to the correct associated egress network port (from the A/B port pair, for example) when the packet is received back from the tools 110 by the network packet broker devices 315a and 315b. This feature enables the inline tools 110 to not only know what port pair the packet came from but which direction the packet is going (from port A to port B or from B to A in a port pair). Such feature allows a single port inline tool 110 to function properly by using packet VIDs to distinguish all traffic. However, this use of VIDs is not compatible with the 802.1Q protocol which requires having a single VID for both transit directions of a logical VLAN traffic.

It is further noted that at least some inline tools 110 may not support any VLAN tags at all. Thus, in various embodiments of the present invention, the AIA device 318 may be configured to utilize a source MAC address learning function described in greater detail below that enables the AIA device 318 to forward network traffic to the proper network segment when the AIA device 318 receives packets from the inline tools 110. However, there are some conditions that impact proper operation of the aforementioned source MAC address learning function. For example, when multiple network segments have L2 connections across inline network port pairs 324-327 as shown in FIG. 3 at least some source MAC addresses may appear across multiple inline networks.

Referring back to FIG. 3, both switches 314 and 316 are L2 switches at the edge of the L2 internal network 304. This means that multicast packets from any device on the internal network 304, such as packets sent by exemplary laptop 322, may show up on multiple inline network ports of the AIA device 318. For example, when the first router 310 sends a multicast packet or a unicast packet to the second router 312, the AIA device 318 receives the packet first on a second port 324 from the first network packet broker device 315a. Once the packet passes through the inline tools 110 it will return back to the AIA device 318. Next, the AIA device 318 transmits the packet via its first port 325 back to the first network 306 via the first network packet broker 315a. However, it is noted that the L2 switching mechanism in the internal network 304 transmits the packet to the second network 308. Thus, effectively the same packet shows up back to the fourth port 326 of the AIA device 318 via the second network packet broker device 315b. This second appearance of the same packet leads to confusion of the aforementioned conventional MAC address learning function since this function does not support L2 connected networks and may effectively cause packet flooding.

Furthermore, conventional MAC address learning function does not typically support networks involving link aggregation. In communication networks, link aggregation allows one or more network connections (i.e., links) to be aggregated together to form a LAG, such that a network client can treat the LAG as if it were a single link. Link aggregation has enabled networking devices to increase throughput and provide redundancy should one of the links within the LAG fail. While link aggregation may be applied across various layers (i.e., of the OSI model), link aggregation is typically applied to the data link layer (i.e., Layer 2), where aggregation occurs across ports of a physical switch. The IEEE 802.1ax standard, which defines link aggregation in detail, stipulates that all the links in a LAG should belong to the same physical switch. Various embodiments of the present invention described below provide enhanced MAC address learning function that supports multiple LAG network segments without flooding L2 traffic.

Figure 4:
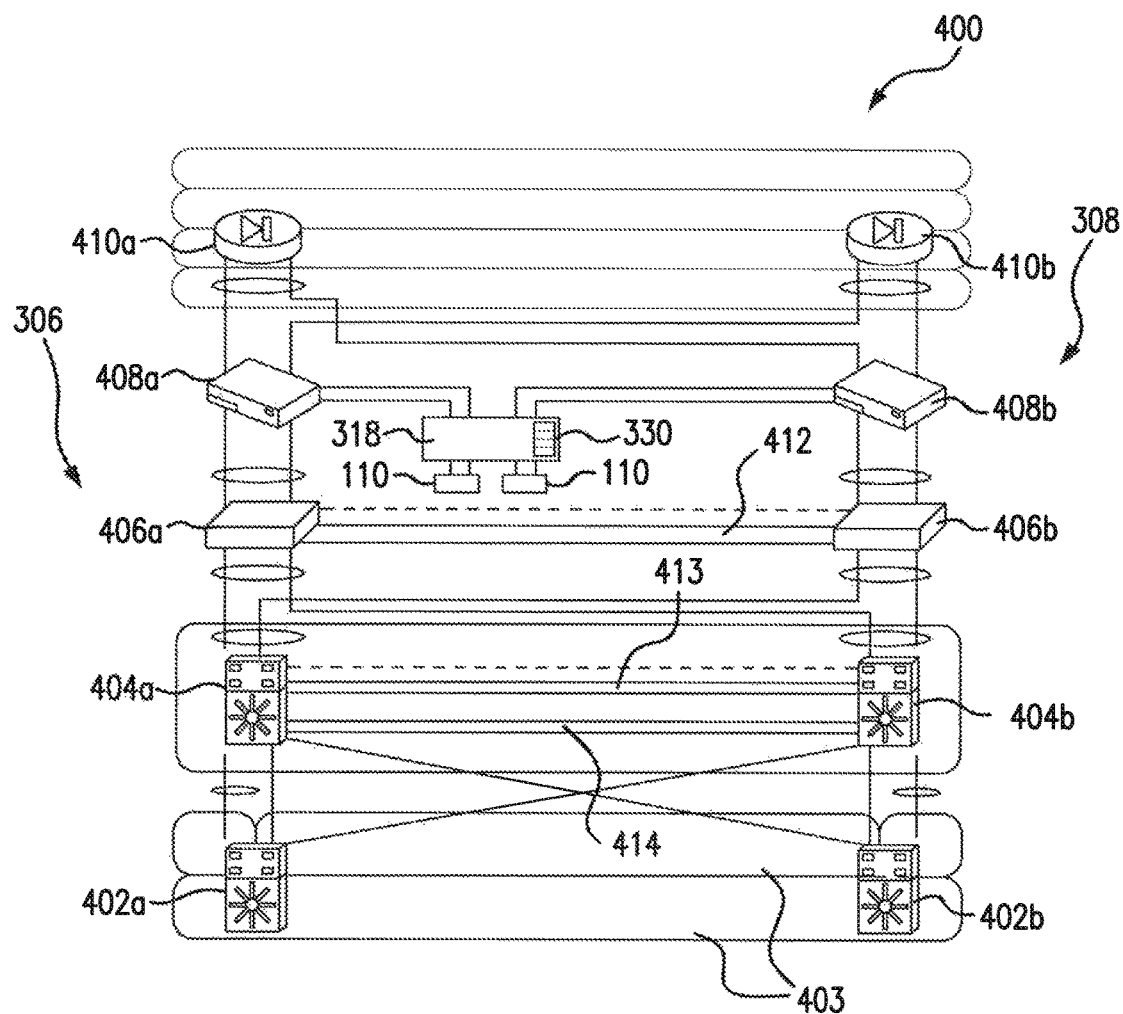
FIG. 4 is a block diagram illustrating aggregation switches in an exemplary multi-chassis communication network, in accordance with an embodiment of the present invention.

FIG. 4 is a block diagram illustrating aggregation switches in an exemplary multi-chassis communication network, in accordance with an embodiment of the present invention. As noted above, there are various reasons for implementing link aggregation on network switches. One such reason is to increase bandwidth by combining the capacity of multiple physical links together into one logical link. Another reason is to provide link redundancy. In the event that a physical link between two network switches fails, the flow of network traffic assigned to this link can be interrupted with the loss of some or all of the packets in the flow. If an aggregation of links is divided between two switches, then network traffic sent by a failing switch can be rerouted to the other switch for transmission in the event that a particular link of the aggregation of links connected to one switch fails.

A portion of an exemplary communication network 400 which includes a plurality of networks involving multi-chassis link aggregation is illustrated in block diagram format in FIG. 4. The plurality of networks may include the primary network 306 and the secondary network 308. Both primary 306 and secondary 308 networks can include a wide variety of components, such as, for example, firewalls 410a and 410b, unified port switches 406a, 406b and special switches 404a, 404b that are configured as an aggregation switch with respect to each other. Each of the switches 404a and 404b contained within the aggregation switch can be connected to a separate switch (such as unified port switches 406a and 406b) or edge routers 402a and 402b over different sets of physical links each of which can be configured on either or both switches 404a and 404b as a LAG. While a relatively small number of switches, network components and links are shown in FIG. 4 for purposes of simplicity in illustration, it will be readily appreciated that many more of each of these components can be included.

As noted above, generally, IP networks are organized in tiers, where the lower tiers include edge routers 402a, 402b that connect to larger core routers 404a, 404b. The edge routers 402a, 402b perform numerous IP protocol functions, whereas the core routers 404a, 404b are mostly called upon to forward traffic from one edge router 402a to another 402b.

To prevent information leaks, an Internet service provider may need to segregate traffic of different customers, and an enterprise may want to segregate traffic of different groups. Virtual routing and forwarding (VRF) may be used for such traffic segregation. VRF is a technology which allows several virtual routers to exist in one Internet router and work simultaneously. Thus, in one embodiment of the present invention, edge routers 402a and 402b may comprise a virtual router. Each virtual router 402a, 402b may be identified by a VRF-ID (a pointer to address spaces in a routing table), and may function according to its own routing table, thus separating traffic of different groups of the enterprise.

Multi-chassis link aggregation ("MLAG") is a LAG implementation where the LAG terminates on two separate chassis or devices. A MLAG can be configured so that one or more links comprising one LAG terminate at ports on a first device and one or more links comprising the same LAG terminate on a second device. The first and second devices are often aggregated so that they appear to the surrounding network to be one logical device. A helpful functionality for configuring a MLAG, for example, is described in the IEEE standards publication 802.3ad. A MLAG is often used to provide link redundancy between two devices in a network. Both or all sets of links associated with a MLAG are typically active. In the event that one set fails, however, then only one set or a subset remains active, in which case all network traffic is directed to the remaining active set(s) of links associated with the MLAG. FIG. 4, illustrates MLAG configuration where Ethernet links between aggregation switches 404a and 404b may be bundled together into one or more virtual PortChannel links (vPCs) 413. As used herein, "vPC" can include EtherChannel, IEEE 802.3ad, and similar mechanisms for aggregating multiple physical network connections (e.g., Ethernet links) to create a single logical network connection via suitable protocols such as Link Aggregation Control Protocol (LACP) and Port Aggregation Control Protocol (PAgP). In some embodiments, MLAG configuration may also couple aggregation switches 404a and 404b via a layer-3 link 414. Also, in an aggregation switch topology, one of the two switches 404a and 404b is often designated at any point in time to be a primary switch, while the other one is then designated as a secondary switch.

At yet another layer, the unified switches 406a, 406b may define a VLAN via which packets are transported over a combination of physical connections. The VLAN in unified switches 406a, 406b can have both virtual tunnel ports and physical ports as its members. In the unified switches 406a, 406b, routing decisions are performed based on ports that correspond to links to other unified switches. The links may be supported by either physical connections or vPC links 412. Thus, from a particular unified switch 406a, 406b, multiple ports (both virtual and physical) may be available to route a packet to a particular destination, since the unified switches 406a and 406b identify routing paths for both physical connections and virtual ports. Furthermore, both primary network 306 and secondary network 308 may include one or more network packet broker devices 408a and 408b, respectively. As noted above, generally, the network packet brokers 408 filter network traffic from port mirrors, network TAPs, and probes. As described above with reference to FIG. 3, network packet broker devices 408a and 408b may serve the filtered network traffic to an advanced inline aggregation device 318 which aggregates the traffic before sending it to the inline tools 110. In operation of the exemplary topology illustrated in FIG. 4, traffic from the connectivity VLANs to the primary 306 and secondary 308 networks may be cleaned by the firewall instances 410a and 410b.

Traditional hashing algorithms may use information from the packet headers at different network layers to distribute traffic. At layer 2, the traditional hashing algorithms determine which outgoing port to use by hashing destination and source MAC addresses. However, if L2 source address fields are not used as the packet distribution hash, the AIA devices 318 may see packets from the same MAC address on different ingress ports which leads to inefficient switching of packets and/or load balancing.

Figure 6:
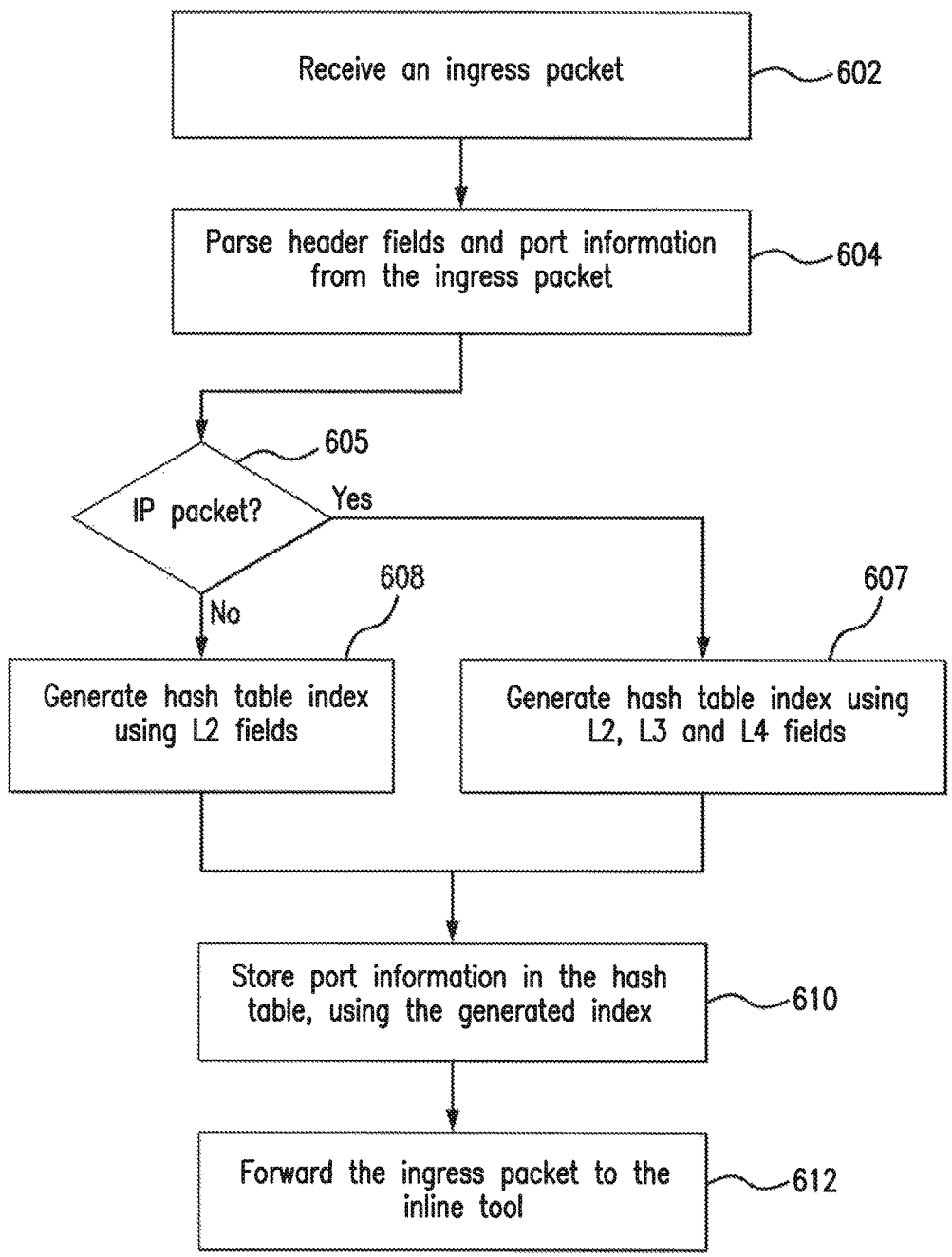
FIG. 6 is a flowchart illustrating exemplary steps performed by the AIA device of FIG. 4 for processing ingress packets, in accordance with an embodiment of the present invention.
Figure 7:
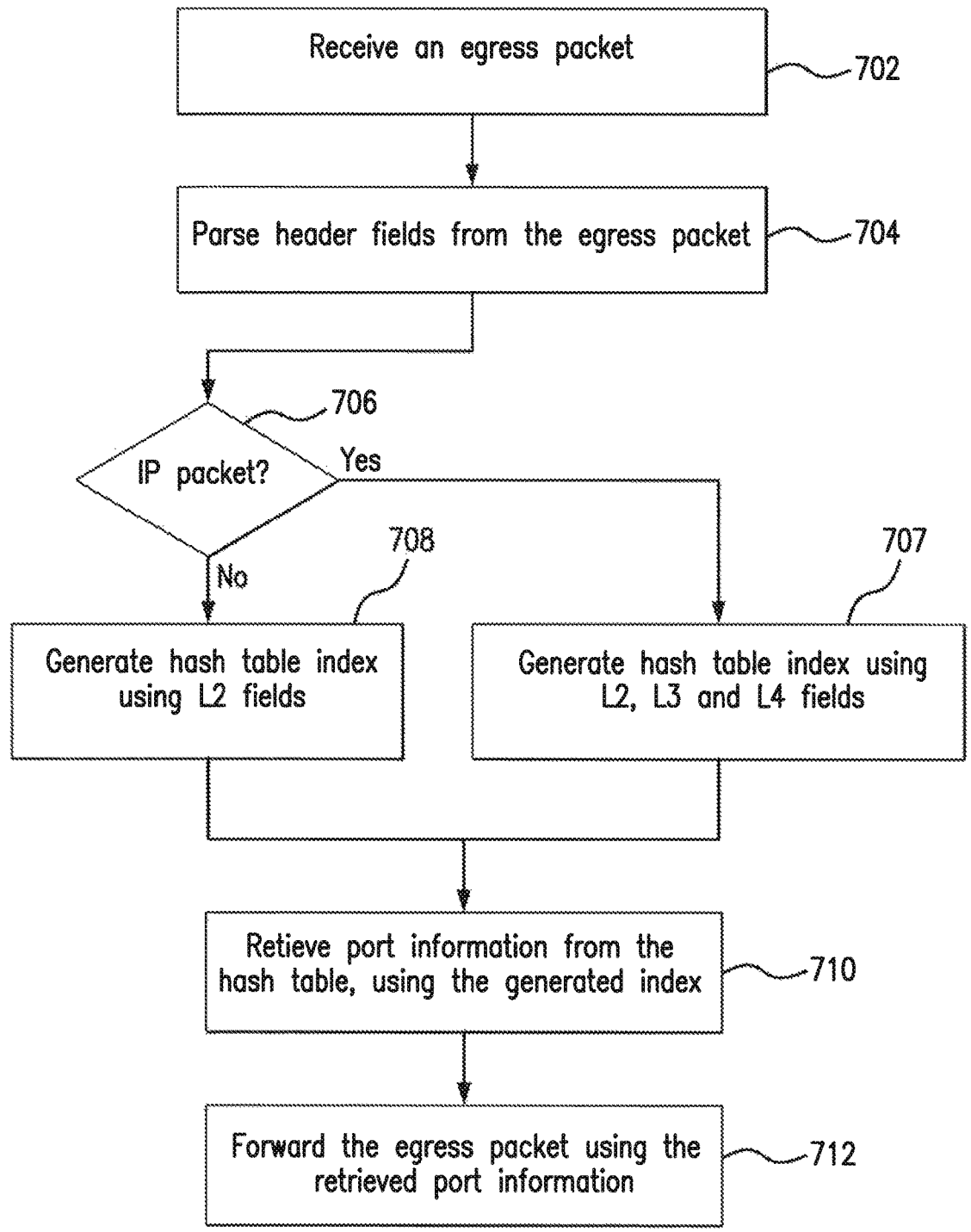
FIG. 7 is a flowchart illustrating exemplary steps performed by the AIA device of FIG. 4 for processing egress packets, in accordance with an embodiment of the present invention.

FIGS. 6 and 7 are flowcharts illustrating exemplary steps for processing ingress and egress packets by the AIA device 318 of FIG. 4 using an enhanced MAC address learning function, in accordance with an embodiment of the present invention. Before turning to descriptions of FIGS. 6 and 7, it is noted that the flow diagrams in FIGS. 6 and 7 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed.

In step 602, the AIA device 318 receives an ingress packet stream from the inline port of the first network packet broker device 408a, for example. In this case, the first network packet broker device 408a acts as a switching device. In step 604, the AIA device 318 processes the received ingress packet stream by evaluating header fields of all received packets. As noted above, the first network packet brokers 408 typically add to each packet header information (i.e., internal VID) uniquely identifying the network port the packet was originally received from. In step 604, the AIA device 318 parse various packet header fields (such as MAC and IP header fields) and extracts the input port information from the received packet header.

Figure 5:
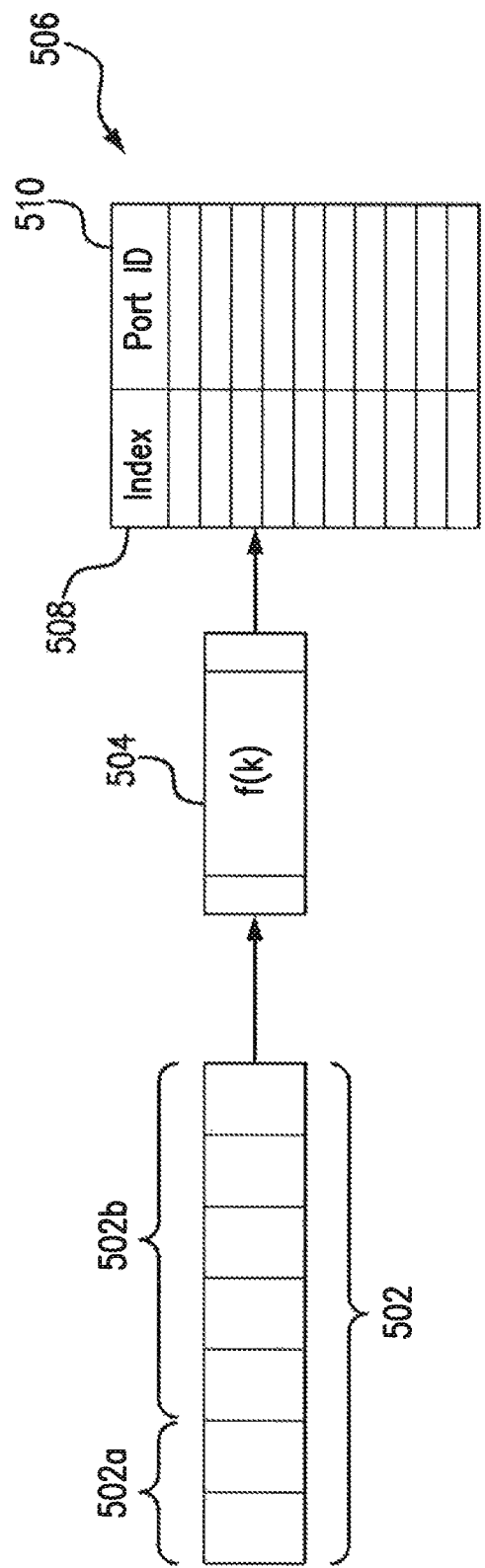
FIG. 5 shows the use of a hash table to store port information indicative of a source network, in accordance with an embodiment of the present invention.

The hash table storage 330 (shown in FIG. 3) is constructed by a conventional local memory, for example, with using hash values as index. The hash table storage 330 stores hash table 506 (shown in FIG. 5) therein. Specifically, FIG. 5 shows the use of a hash table to store port information, in accordance with an embodiment of the present invention. A hash function is shown that is used to transform the packet header fields 502 into a numbered index location 508 of the hash table 506. The ingress port information 510 associated with the packet is saved at the index location 508 to facilitate later searching and retrieval.

The hash function f (K) 504 is selected to produce a uniform scattering of header fields' transformations across the numbered index of the hash table 506. Consequently, the function will depend on the variation of packet header fields. According to an embodiment of the present invention, a packet header may include the fields shown in table 1 below:

TABLE 1

| Field | Size |
| --- | --- |
| L2 MAC source address | 48 bits |
| L2 MAC destination address | 48 bits |
| L3 source address | 4 bytes (IPv4) or 16 byes (IPv6) |
| L3 destination address | 4 bytes (IPv4) or 16 byes (IPv6) |
| L3 protocol field | 20 bits (IPv6 only) |
| L4 TCP/UDP source port | 2 bytes |
| L4 TCP/UDP destination port | 2 bytes |

Hash functions in general are well-known in the art. In one embodiment, a 12 bit (or larger) cyclic redundancy check (CRC) based hashing mechanism can be utilized since a relatively low number of bits (192 for IPv4 and 404 for IPv6) is being hashed, thus providing a relatively high probability of uniqueness for a generated hash index 508. In other words, a 12-bit CRC hash function may provide desirable hash function features including collision resistance, which means that the hash function is very unlikely to generate the same hash for different inputs (header fields), and uniformity, which means that the hashes generated by the hash function are distributed evenly. It is noted the CRC selected is implementation dependent. For example, in alternative embodiment, a 32 bit CRC based hashing mechanism may be utilized. It is further noted that, in one embodiment, each entry in the hash table storage 330 may also include a timestamp indicating when an entry was last updated for aging out entries from table that equal or exceed a user-configurable age interval. In one embodiment the age interval may range from approximately 2 msec. to approximately 128 sec. The default value for the age interval may be, for example, approximately 10 msec. In various embodiments, users may adjust the age interval value based on the expected latency of the inline tools 110.

Referring back to FIG. 6, in step 605, according to an embodiment of the present invention, after parsing the header of the received packet (step 604), the AIA device 318 first checks to determine whether it is an IP packet. If this determination is negative (step 605, "No" branch), then, in step 608, the AIA device 318 generates the hash table index 508 using only L2 fields 502a of the packet header 502. In other words, if the packet being processed is not an IP packet, the hashing transformation of the first two fields listed in the table 1 above is sufficient to generate the hash table index 508. If the packet being processed is an IP packet (step 605, "Yes" branch), then the AIA device 318 combines the L2 fields 502a and L3 and L4 fields 502b of the packet header to generate the hash table index 508 (step 606). As noted above the hash table 506 is indexed with the hash index 508 to store the associated ingress port information 510 in an entry of the hash table (step 610). While the foregoing describes indices 508 as hash values generated by a hash function, indices 508 of table 506 may be other values generated by other functions, which are configured to generate indices.

Once the AIA device 318 completes the steps described above, in step 612, it removes port identification information from packet's header and forwards the ingress packet to one of the inline tools 110. It is noted that steps 604-610 are repeated by the AIA device 318 for each packet in the received ingress packet stream. Accordingly, in step 612, the AIA device 318 may aggregate a plurality of packets prior to sending them to one of the inline tools 110.

FIG. 7 is a flowchart illustrating exemplary steps for processing egress packets, in accordance with an embodiment of the present invention. In step 702, the AIA device 318 receives an egress packet stream from one of the inline tools 110. It is noted that egress packets should travel from the inline tools 110 back to the network they originated from. In step 704, the AIA device 318 parses various egress packet header fields. In step 706, according to an embodiment of the present invention, after parsing the header of the received egress packet, the AIA device 318 again checks to determine whether it is an IP packet. If this determination is negative (step 706, "No" branch), then, in step 708, the AIA device 318 generates the hash table index 508 using only L2 fields 502a of the packet header 502. Alternatively, (step 706, "Yes" branch) the AIA device 318 combines the L2 fields 502a and L3 and L4 fields 502b of the packet header to generate the hash table index 508 (step 707), as described above. Since the AIA device 318 uses the same function in steps 606-608 and 707-708 and since the hash function is deterministic, when the same hash key (i.e., same packet header fields) is supplied the same hash value will be returned.

Next, in step 710, the AIA device 318 utilizes the generated index for a retrieval of the port identification information from the hash table 506. The retrieved port identification information indicates which network the egress packet needs to be transmitted to. Once the AIA device 318 determines a destination (egress) port from the corresponding inline port pair, it sends the packet back to the network that transmitted the corresponding ingress packet to the AIA device 318 (step 712).

In summary, when two or more networks are aggregated together as members of a LAG, the interconnected switching devices will distribute the packets to a particular network segment based on a configurable combination of L2 and L3 information in the packet. According to an embodiment of the present invention, the enhanced MAC learning function supports network segments that are members of a LAG and involves a technique to identify packet's originating network based on the same packet information used by the connected switching devices to distribute the packets. Advantageously, when an ingress packet is received by the AIA device 318 from a network interface, the AIA device 318 performs the hash function to transform the packet header fields 502 into a numbered index location and store the port identification information in a table using the generated index prior to forwarding the packet to one of the inline tools 110. Once the corresponding egress packet travels back from the inline tool 110, the AIA device 318 again performs the same hashing transformation to retrieve from the table the port identification information indicative of packet's originating network. The retrieved information is added to the packet header by the AIA device 318 prior to forwarding the egress packet to a particular switching device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for maintaining packet's source network identification information while aggregating packets from a plurality of networks, the method comprising:
    processing an ingress packet to extract a plurality of packet header fields and port identifier;
    generating a first hash index by hashing information associated with the plurality of packet header fields from the ingress packet;
    storing the port identifier in a hash table using the generated first hash index;
    forwarding the ingress packet to one or more inline tool devices configured to monitor and analyze a flow of Multi Link Aggregation Group (MC-LAG) traffic configured such that one or more links comprising one LAG terminate at ports on a first device and one or more links comprising the same LAG terminate on a second device;
    processing an egress packet received from the one or more inline tools to extract the plurality of packet header fields from the egress packet;

generating a second hash index by hashing information associated with the plurality of packet header fields from the egress packet;

retrieving the port identifier from the hash table based on the generated second hash index; and transmitting the egress packet to a switching device based on the retrieved port identifier.

2. The method of claim 1, wherein the plurality of packet header fields comprises Layer 2 (L2) source and destination addresses.

3. The method of claim 2, wherein the processing an ingress packet received from an inline network port comprises determining whether the received ingress packet comprises an IP packet.

4. The method of claim 3, wherein the plurality of packet fields further comprises at least one of Layer 3 (L3) source and destination addresses, Layer 4 (L4) source and destination ports and L3 protocol field.

5. The method of claim 4, wherein the first and second hash indices are generated by a cyclic redundancy check 32 (CRC 32) function.

6. The method of claim 5, wherein the first and second hash indices are generated by the CRC 32 function using the L2 source and destination addresses as hashing keys, responsive to a determination that the ingress packet comprises an IP packet.

7. The method of claim 1, wherein processing an ingress packet received from an inline network port and processing an egress packet received from the one or more inline tool devices comprises parsing MAC and IP header fields of the corresponding packets.

8. The method of claim 1, wherein a plurality of ingress packets comprises aggregate packets from a plurality of networks comprising a Link Aggregation Group (LAG).

9. A system comprising:
a plurality of networks comprising a Link Aggregation Group (LAG);
one or more inline tool devices configured to monitor and analyze a flow of LAG network traffic; and
an Advanced Inline Aggregation (AIA) device connected to each of the plurality of networks and connected to the one or more inline tool devices, the AIA device having stored therein a plurality of programming instructions, which when executed on the AIA device cause the AIA device to:
process an ingress packet to extract a plurality of packet header fields and port identifier;
generate a first hash index by hashing information associated with the plurality of packet header fields from the ingress packet;
store the port identifier in a hash table using the generated first hash index;
forward the ingress packet to one or more inline tool devices configured to monitor and analyze a flow of Multi Link Aggregation Group (MC-LAG) traffic configured such that one or more links comprising one LAG terminate at ports on a first device and one or more links comprising the same LAG terminate on a second device;
process an egress packet received from the one or more inline tools to extract the plurality of packet header fields from the egress packet;
generate a second hash index by hashing information associated with the plurality of packet header fields from the egress packet;
retrieve the port identifier from the hash table based on the generated second hash index; and
transmit the egress packet to a switching device based on the retrieved port identifier.

10. The system of claim 9, wherein the plurality of packet header fields comprises Layer 2 (L2) source and destination addresses.

11. The system of claim 10, wherein the processing an ingress packet received from an inline network port comprises determining whether the received ingress packet comprises an IP packet.

12. The system of claim 11, wherein the plurality of packet fields further comprises at least one of Layer 3 (L3) source and destination addresses, Layer 4 (L4) source and destination ports and L3 protocol field.

13. The system of claim 12, wherein the first and second hash indices are generated by a cyclic redundancy check 32 (CRC 32) function.

14. The system of claim 13, wherein the first and second hash indices are generated by the CRC 32 function using the L2 source and destination addresses as hashing keys, responsive to a determination that the ingress packet comprises an IP packet.

15. The system of claim 9, wherein processing an ingress packet received from an inline network port and processing an egress packet received from the one or more inline tool devices comprises parsing MAC and IP header fields of the corresponding packets.

16. The system of claim 9, wherein the hash table contains a plurality of associations between the generated indices and corresponding port identifier information.

17. The system of claim 9, wherein the AIA device comprises a Field Programmable Gate Array (FPGA).

18. The system of claim 9, wherein entries exceeding a predetermined age interval are aged out from the hash table.

* * * * *